(12) United States Patent
Horiuchi (10) Patent No.: US 12,208,614 B2
(45) Date of Patent: Jan. 28, 2025

(54) PRINTING SYSTEM AND CONTROL DEVICE

(71) Applicant: MIMAKI ENGINEERING CO., LTD., Nagano (JP)

(72) Inventor: Yuhei Horiuchi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 273 days.

(21) Appl. No.: 17/761,205

(22) PCT Filed: Nov. 6, 2020

(86) PCT No.: PCT/JP2020/041501
§ 371 (c)(1),
(2) Date: Mar. 17, 2022

(87) PCT Pub. No.: WO2021/100495
PCT Pub. Date: May 27, 2021

(65) Prior Publication Data
US 2022/0410563 A1   Dec. 29, 2022

(30) Foreign Application Priority Data

Nov. 18, 2019   (JP) ................. 2019-208269

(51) Int. Cl.
*B41J 2/21* (2006.01)
*B41J 2/045* (2006.01)

(52) U.S. Cl.
CPC ....... *B41J 2/04508* (2013.01); *B41J 2/04586* (2013.01)

(58) Field of Classification Search
CPC ...... B41J 2/2132; B41J 2/2142; B41J 3/4078; B41J 29/38; B41J 29/393; B41J 2029/3935
See application file for complete search history.

(56) References Cited

U.S. PATENT DOCUMENTS

| | | | |
|---|---|---|---|
| 2016/0236466 A1* | 8/2016 | Takahashi | B41J 2/04573 |
| 2019/0001709 A1* | 1/2019 | Yoda | H04N 1/605 |

(Continued)

FOREIGN PATENT DOCUMENTS

| | | |
|---|---|---|
| JP | 07276673 | 10/1995 |
| JP | 2002169608 | 6/2002 |

(Continued)

OTHER PUBLICATIONS

"Office Action of China Counterpart Application", issued on Feb. 24, 2023, with English translation thereof, p. 1-p. 22.

(Continued)

*Primary Examiner* — Scott A Richmond (74) *Attorney, Agent, or Firm* — JCIPRNET (57) ABSTRACT

The disclosure more appropriately creates a product of printing closer to the target state. A printing system (10) that creates a product of printing includes a printer (16) that is a printing apparatus that executes a printing step, a steaming machine (18) that is a device for a predetermined step that is a device that executes a predetermined step, and a control device (12); where the control device (12) acquires printed matter information that is information indicating a state of a printed matter obtained by performing the printing step by the printer (16), and adjusts a condition of a step to be executed in the steaming machine (18) based on information indicating a state of the target product and the printed matter information such that a product in a state closer to a state indicated by target product information is obtained.

14 Claims, 4 Drawing Sheets

(56) References Cited

U.S. PATENT DOCUMENTS

2020/0101717 A1* 4/2020 Nishikawa ............. B41J 2/2142
2020/0108650 A1* 4/2020 Zavada ............... C04B 41/5022

FOREIGN PATENT DOCUMENTS

| JP | 2005163239 | 6/2005 |
| JP | 2007144759 | 6/2007 |
| JP | 2008052115 | 3/2008 |
| JP | 2016165858 | 9/2016 |

OTHER PUBLICATIONS

Office Action of Japan Counterpart Application, with English translation thereof, issued on Dec. 20, 2022, pp. 1-28.
"International Search Report (Form PCT/ISA/210) of PCT/JP2020/041501", mailed on Dec. 8, 2020, with English translation thereof, pp. 1-6.

* cited by examiner

PRINTING SYSTEM AND CONTROL DEVICE

CROSS-REFERENCE TO RELATED APPLICATION

This application is a 371 application of the International PCT application serial no. PCT/JP2020/041501, filed on Nov. 6, 2020, which claims the priority benefits of Japan Patent Application No. 2019-208269, filed on Nov. 18, 2019. The entirety of each of the above-mentioned patent applications is hereby incorporated by reference herein and made a part of this specification.

TECHNICAL FIELD

The present invention relates to a printing system, a control device, and a printing method.

BACKGROUND ART

Conventionally, printing apparatuses have been used in various fields. Furthermore, when printing is performed by the printing apparatus, various pre-processing steps and post-processing steps may be performed in addition to the printing step executed by the printing apparatus depending on the purpose of printing, the medium (media) to be used, and the like (see e.g., Patent Literature 1.).

CITATION LIST

Patent Literature

Patent Literature 1: Japanese Unexamined Patent Publication No. 2002-169608

SUMMARY OF INVENTION

Technical Problems

When a pre-processing step or a post-processing step is performed in addition to a printing step, which is a step of performing printing by a printing apparatus, for example, the operation of each step is sequentially performed according to a production condition that designates the condition of each step. However, in a case where a plurality of steps is executed in combination, it is considered that an unintended result is likely to occur as compared with a case where only one step is executed. Therefore, when a pre-processing step or a post-processing step is executed other than the printing step, it is desirable to more appropriately manage the operation of each step. The present invention thus provides a printing system, a control device, and a printing method capable of solving the problems described above.

Solutions to Problems

The inventor of the present application conducted a thorough research on a configuration for more appropriately performing management of each step with respect to a printing system for creating a product by performing a predetermined step other than the printing step. First, instead of individually managing a plurality of steps including a printing step for every step, it was considered to manage the plurality of steps collectively by associating a condition of a step to be selected (determined) for each step and a result obtained in each step. With this configuration, when an unintended result occurs in any of the steps, not only the condition of the step but also the conditions of other steps and the like can be more appropriately adjusted. More specifically, in this case, it is considered to adjust the condition of the step other than the printing step based on the result obtained in the printing step. With this configuration, when the state of the printed matter obtained by performing the printing step does not become the intended state, and the like, the adjustment of the conditions of other steps, and the like can be more easily and appropriately performed.

Through further thorough research, the inventor of the present application found features necessary for obtaining such effects and contrived the present invention. In order to solve the above problems, the present invention provides a printing system that creates a product of printing by performing at least printing, the printing system including a printing apparatus that executes a printing step of performing printing by ejecting ink; a device for a predetermined step, which is a device that executes a predetermined step before or after the printing step to create the product; and a control device that determines conditions of the printing step and the predetermined step; where the control device acquires printed matter information that is information indicating a state of a printed matter obtained by performing the printing step by the printing apparatus, and adjusts a condition of the predetermined step executed by the device for a predetermined step based on target product information, that is information indicating a state of the target product, and the printed matter information such that the product in a state closer to a state indicated by the target product information is obtained.

When configured in such manner, the predetermined step executed by the device for a predetermined step can be adjusted based on a state of a printed matter obtained by performing the printing step. Thus, according to such configuration, the condition of the step (predetermined step) other than the printing step can be more appropriately adjusted. In addition, as a result, a product closer to the target state can be more appropriately created.

In this configuration, the printed matter information can be considered as information indicating the state of the printed matter obtained by actually executing the printing step in the printing apparatus. Furthermore, the printed matter information can also be considered as information obtained by measurement or the like on the printed matter, and the like, instead of information predicted from conditions or the like of the printing step. The target product can be considered as a desired product or the like to be obtained by performing each step in the printing system. In addition, the control device preferably adjusts the condition of each step in further consideration of environmental conditions such as ambient temperature and humidity. According to such a configuration, the condition of the step can be more appropriately adjusted.

Furthermore, in this configuration, the control device determines the condition of the predetermined step to be executed by the device for a predetermined step for example, by performing selection from a plurality of conditions prepared in advance as the selectable condition of the predetermined step. Thus, according to such configuration, the condition of the predetermined step to be adjusted can be more easily and appropriately adjusted.

Furthermore, in this configuration, the control device may have a function of learning for, for example, the relationship of the state of the product obtained by executing the printing step and the predetermined step, the condition of the printing step, and the condition of the predetermined step. In this case, the plurality of conditions prepared in advance as the selectable conditions of the predetermined step include conditions prepared by performing this learning. With this configuration, for example, a condition corresponding to the state of the product to be actually created, or the like can be more appropriately prepared as the plurality of selectable conditions. Thus, the condition of the predetermined step to be adjusted can be more appropriately adjusted. In this case, the control device performs, for example, machine learning as learning. Furthermore, for example, it is conceivable to perform deep learning as the machine learning. With this configuration, the control device can appropriately perform learning.

Furthermore, in this configuration, the predetermined step executed in the device for a predetermined step is, for example, a post-processing step performed after the printing step. In this case, the device for a predetermined step can be considered as a post-processing machine or the like that executes the post-processing step on the printed matter obtained by performing the printing step with the printing apparatus. According to such a configuration, the condition of the post-processing step can be appropriately adjusted.

In this case, the control device may cause the printing apparatus to execute the printing step under a determined printing condition, which is a condition of the printing step determined based on the target product information. The control device may detect, based on the printed matter information, a printing state difference that is a difference between a state of the printed matter predicted to be obtained when the printing step is performed under the determined printing condition and a state of the printed matter obtained by actually performing the printing step, and determine the condition of the post-processing step based on the printing state difference, thereby adjusting the condition of the post-processing step to be executed in the post-processing machine such that a product in a state closer to the state indicated by the target product information is obtained. According to such a configuration, the condition of the post-processing step can be more appropriately adjusted.

In this case, the state of the printed matter predicted to be obtained when the printing step is performed under the determined printing condition can be considered as the state of the desired printed matter, and the like. Furthermore, the printing state difference can be considered as a difference between the state of the printed matter obtained by actually performing the printing step and the state of the desired printed matter, and the like.

Furthermore, in this case, even if the difference between the state of the printed matter obtained by actually performing the printing step and the state of the desired printed matter, and the like is large, the state of the product ultimately obtained can be brought close to the desired condition by adjusting the condition of the post-processing step to be carried out thereafter. This makes it possible to obtain a desired product by performing a so-called recovery process without wasting the printed matter. Furthermore, for example, waste can also be reduced for the ink used in the printing step, the time required to carry out each step, and the like. Thus, in such a recovery process, the control device causes the post-processing machine to execute the post-processing step on the printed matter used to detect the printing state difference under the condition of the post-processing step determined based on the printing state difference.

Furthermore, with respect to each step executed in this configuration, more specifically, the printing step may be, for example, a step of ejecting ink that undergoes a color development process after the printing step. Furthermore, the post-processing step may be, for example, a step of performing the color development process on the ink used in the printing step. In this case, the target product information indicates the target color of the product to obtain by performing the color development process. Furthermore, the control device adjusts the condition of the post-processing step executed in the post-processing machine based on a color in a state where the color development process in the printed matter obtained by performing the printing step by the printing apparatus is not performed such that the color of the ink obtained by performing the color development process matches the target color. With such a configuration, the product colored in a desired color can be more appropriately created.

Furthermore, in this case, the control device determines at least the heating temperature and the heating time at the time of executing the color development process as the condition of the post-processing step. According to such configuration, when the color development process is performed as the post-processing step, the condition of the post-processing step can be appropriately adjusted. Furthermore, in this case, it is conceivable to use, for example, a fabric medium (e.g., fabric) as a medium (media) to be the target of printing. As the color development process, for example, it is conceivable to perform the color development process in the case where textile printing process is performed on the fabric medium.

Furthermore, as an example of each step, an example different from the above can be considered. For example, the printing step may be a step of ejecting ink that undergoes a firing process after the printing step. In this case, the printing apparatus creates a three-dimensional shaped object by layering layers of ink in the printing step. Furthermore, as the post-processing step, a step of performing a firing process on the shaped object created in the printing step is executed. In this case, the target product information indicates an after-processing target state, which is a state of the shaped object to be obtained after the firing process is performed. Furthermore, the control device adjusts the condition of the post-processing step executed in the post-processing machine based on the state of the shaped object created in the printing step such that the state of the shaped object after the firing process is performed approaches the after-processing target state. In this case, the state of the shaped object created in the printing step can be considered as the state of the shaped object after the printing step is performed and before the firing process is performed, and the like. Even with such a configuration, the condition of the post-processing step can be more appropriately adjusted.

Furthermore, when performing such a post-processing step, the shaped object created by the printing step can be considered as an example of a printed matter. The state of the shaped object can be considered as the state of the printed matter. In addition, the printed matter information can be considered as information indicating the state of the shaped object, and the like. Furthermore, when performing such a post-processing step, for example, even if the difference between the state of the shaped object obtained by actually performing the printing step and the state of the desired shaped object, and the like is large, the state of the product ultimately obtained can be brought close to the desired condition by adjusting the condition of the post-processing step to be carried out thereafter. Thus, even when configured in such manner, the recovery process can be appropriately carried out. In this configuration, the control device determines at least a temperature raising process condition indicating how to raise the temperature in the firing process as a condition of the post-processing step. According to such a configuration, the condition of the post-processing step can be appropriately adjusted.

Furthermore, in the printing system, the condition of the step may be adjusted for a purpose other than the recovery process. For example, when it is difficult to change the condition of a predetermined step other than the printing step, it is also conceivable to adjust the condition of the printing step based on the state of the product obtained by performing the printing step, the predetermined step, and the like. Furthermore, in this case, it is conceivable to make the operation and the like of the control device in the printing system partially different from the above.

More specifically, in this case, the control device adjusts the condition of the printing step based on the state of the product obtained by actually executing the printing step and the predetermined step with the printing apparatus and the device for a predetermined step, the target product information, and the condition of the predetermined step executed in the device for a predetermined step such that a product in a state closer to the state indicated by the target product information is obtained. Even with such a configuration a product closer to the target state can be more appropriately created.

Furthermore, in this case, the control device determines the condition of the printing step to be executed by the printing apparatus by, for example, performing selection from a plurality of conditions prepared in advance as the selectable condition of the printing step. According to such a configuration, the printing condition can be easily and appropriately adjusted. Furthermore, the control device may have a function of learning for the relationship of the state of the product obtained by executing the printing step and the predetermined step, the condition of the printing step, and the condition of the predetermined step. In addition, the plurality of conditions prepared in advance as the selectable conditions of the printing step include conditions prepared by performing this learning. With this configuration, a condition corresponding to the state of the product to be actually created, or the like can be appropriately prepared as the plurality of selectable conditions. Thus, the condition of the printing step can be more appropriately adjusted. In this case as well, the control device performs, for example, machine learning as learning. Furthermore, for example, it is conceivable to perform deep learning as the machine learning. With this configuration, the control device can appropriately perform learning. In this case, the predetermined step is, for example, a post-processing step.

Furthermore, it is conceivable to use a control device, a printing method and the like having features similar to the above for the configuration of the present invention. In this case as well, for example, effects similar to the above can be obtained.

Effect of the Invention

According to the present invention, a product of printing closer to the target state can be more appropriately created.

DESCRIPTION OF EMBODIMENT

Figure 1:
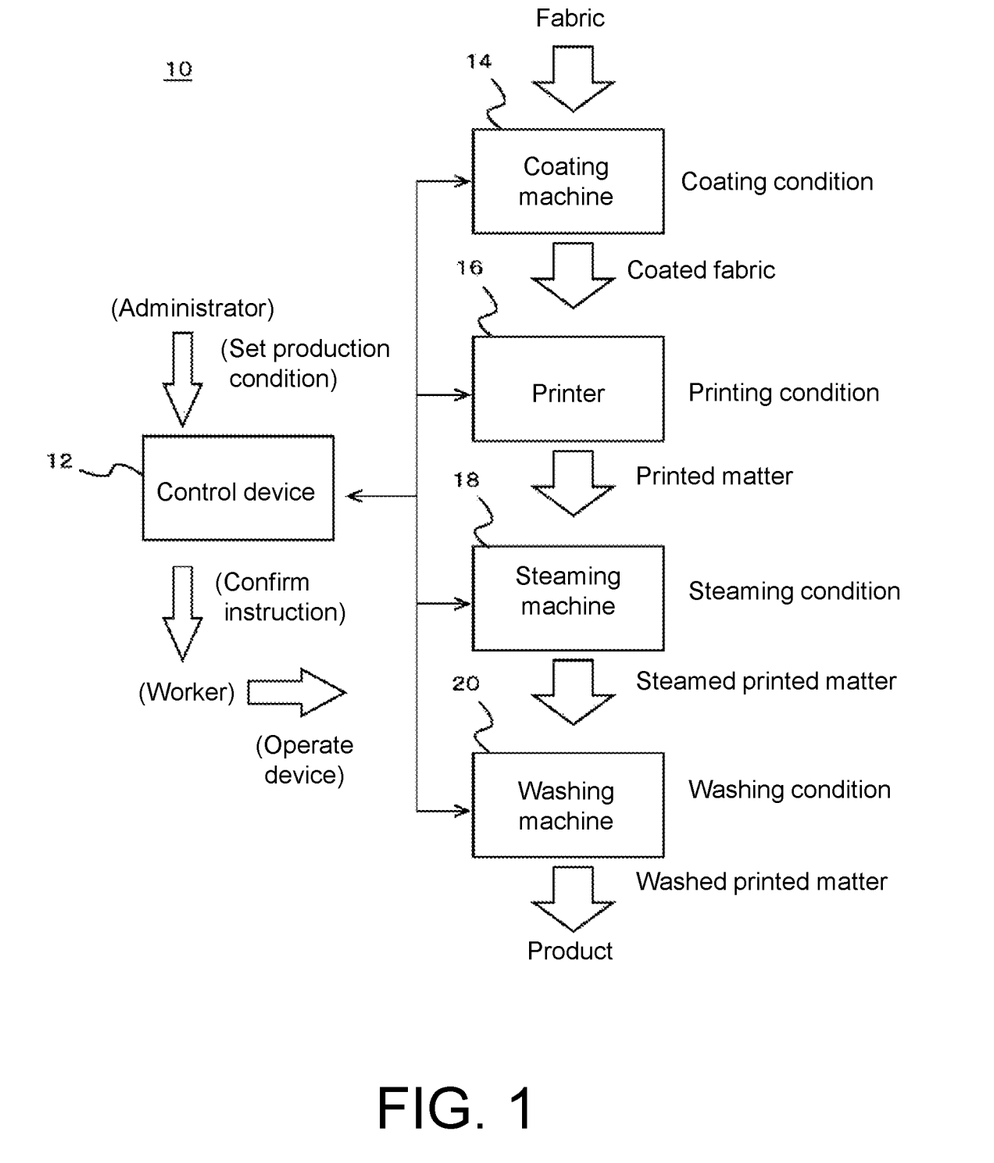
FIG. 1 is a view describing a printing system 10 according to one embodiment of the present invention.

Hereinafter, an embodiment according to the present invention will be described with reference to the drawings. FIG. 1 is a view describing a printing system 10 according to one embodiment of the present invention and shows one example of a configuration and an operation of the printing system 10. Other than the points described below, the printing system 10 of the present example may have features same as or similar to the known printing systems. Furthermore, other than the points described below, each device configuring the printing system 10 of the present example may have features same as or similar to each device configuring the known printing systems.

In the present example, the printing system 10 is an example of a printing system that creates at least a product obtained by performing printing, and creates a product of printing by performing a predetermined pre-processing step and post-processing step other than the printing step. More specifically, the printing system 10 performs printing through an inkjet method on a fabric medium (media) to produce a textile. In this case, the produced textile can be considered as a product of printing created in the printing system 10. Furthermore, in order to perform such an operation, the printing system 10 includes a control device 12, a coating machine 14, a printer 16, a steaming machine 18, and a washing machine 20.

The control device 12 is a computer that manages production conditions for creating a product of printing in the printing system 10. Furthermore, in the present example, the control device 12 manages a condition of a step executed in each device in the printing system 10, and the like as the production condition. Moreover, the control device 12 is communicably connected to each device in the printing system 10 via a network (e.g., LAN), and inputs and outputs data, commands, and the like as necessary. In this case, for example, MDL command or the like can be suitably used as the command. The MDL command is a command created based on the MDL command SDK (Software Development Kit) provided by Mimaki Engineering Co., Ltd.

More specifically, in the printing system 10 of the present example, the control device 12 inputs or outputs information with an administrator or a worker of the printing system 10 as illustrated in the figure, for example, as necessary. In this case, the administrator of the printing system 10 can be considered as a higher-level user or the like who determines a product to be created in the printing system 10. Furthermore, the worker can be considered as a user at the site who performs an operation and the like on each device in the printing system 10 as necessary.

In this case, the control device 12 sets the production condition, for example, according to an instruction of an administrator of the printing system 10. Setting the production condition in accordance with the instruction of the administrator means setting the production condition designated by the administrator in accordance with an operation or the like of the administrator or another user who has received the instruction of the administrator. In the present example, the printing system 10 sets the fabric to use, the coating condition, the printing condition, the steaming condition, the washing condition, and the like as the production condition. In this case, the fabric to use is a fabric used as a medium in the printing system 10. The coating condition, the printing condition, the steaming condition, and the washing condition are conditions of steps executed in the coating machine 14, the printer 16, the steaming machine 18, and the washing machine 20. Furthermore, as will be described below, in the present example, the condition of each step executed in the printing system 10 is adjusted, as necessary. Therefore, the production condition set according to the instruction of the administrator can also be considered as an initial value of the production condition.

Furthermore, the production condition can also be considered as, for example, a condition for creating a target product (desired product). More specifically, in the present example, the control device 12 sets the production condition based on target product information, which is information indicating a state of a target product. In this case, it is conceivable that the control device 12 sets the state of the product according to an instruction from an administrator or the like of the printing system 10, and sets the production condition in accordance with the target product information indicating the state of the product. Regarding the operation of the control device 12, it can also be considered that the condition of each step executed by each device in the printing system 10 is determined based on the target product information. In this case, determining the condition of each step may be, for example, selecting one of a plurality of conditions prepared in advance as the condition of each step constituting the production condition.

Furthermore, the control device 12 controls the operation of each device in the printing system 10 based on the set production condition. In this case, the control device 12 controls the operation of each device using, for example, a command such as an MDL command. In addition, control with a command or the like may be difficult depending on the condition of the step performed in each device, or the like. In this case, the control device 12 controls the operation of each device through hands of the worker by giving an instruction to the worker by, for example, display on a monitor or the like. Furthermore, in the present example, the control device 12 can also be considered as a job controller or the like that controls work executed by each device in the printing system 10.

The coating machine 14 is an example of a device for a predetermined step and a pre-processing machine. In this case, the device for a predetermined step is a device that executes a predetermined step before or after the printing step to create a product of printing by the printing system 10. Furthermore, the pre-processing machine is a device that executes a pre-processing step on a medium before the printing step is performed in the printer 16. More specifically, in the present example, the coating machine 14 executes the coating step on the medium before executing the printing step in the printer 16. The coating step is, for example, a step of applying a predetermined pre-processing agent to a fabric medium. Further, the coating machine 14 executes the coating step on the fabric designated under the production conditions set with respect to the control device 12 under the coating conditions similarly designated in the production conditions. Thus, the coating machine 14 produces the coated fabric according to the production conditions. Furthermore, as described above, in the printing system 10 of the present example, printing through the inkjet method is performed on the fabric medium. Therefore, in the present example, the coating machine 14 applies a coating agent, which is an example of a pre-processing agent, to the fabric before printing to create an ink receiving layer on the fabric. As the coating agent, a known coating agent can be suitably used.

The printer 16 is a printing apparatus that executes a printing step. Furthermore, in the present example, the printer 16 is an inkjet printer, and performs printing on the coated fabric created by the coating machine 14 by ejecting ink through an inkjet method. In this case, performing printing can be considered as drawing an image by ejecting ink to an ejection position designated by print data indicating an image to be printed. In the present example, the printer 16 receives print data from the control device 12, and executes the printing step under the conditions (printing conditions) of the printing step designated in the production conditions set with respect to the control device 12. Thus, the control device 12 creates the printed matter according to the production condition. More specifically, in the present example, the printer 16 executes the printing step using ink for textile printing on the fabric. As the ink for textile printing, an ink that undergoes the color development process after the printing step is used. As such ink, known ink for textile printing can be suitably used.

The steaming machine 18 and the washing machine 20 are an example of a device for a predetermined step and a post-processing machine. In this case, the post-processing machine is a device that executes a post-processing step performed after the printing step. In the present example, the steaming machine 18 and the washing machine 20 execute the post-processing step on the printed matter obtained by performing the printing step by the printer 16.

More specifically, the steaming machine 18 is a device that performs a steaming process (steaming step) on a fabric, which is a printed matter. In this case, the steaming process can be considered as a color development process or the like for causing the ink to develop color by steaming the fabric to which the ink for textile printing is attached with high temperature steam. In this case, in the steaming machine 18, it can be considered that a step of performing the color development process on the ink used in the printing step is executed as the post-processing step. The color development process performed in the steaming machine 18 can be considered as a color development process or the like when textile printing is performed on a fabric medium. Furthermore, this color development process can also be considered as a process of fixing the color after printing, and the like. In the present example, the steaming machine 18 executes the steaming process under the steaming condition designated in the production condition set with respect to the control device 12. Thus, the steaming machine 18 creates a steamed printed matter according to the production condition.

The washing machine 20 is a device that performs a washing process (washing step) on the printed matter after the color development process is performed. The washing process can be considered as a process of removing an extra coating agent or the like attached to the fabric as a printed matter. In the present example, the washing machine 20 executes the washing process under the washing condition designated in the production condition set with respect to the control device 12. Thus, the washing machine 20 creates a washed printed matter according to the production condition. Furthermore, in the present example, the washed printed matter can be considered as a product created in the printing system 10.

As described above, according to the present example, the product of printing can be appropriately created. Furthermore, in this case, each step (pre-processing step, printing step, and post-processing step) performed to create a product can be intensively managed in the control device 12 by managing the production conditions in the control device 12. In this case, the configuration of the printing system 10 can also be considered as a system that manages all of the pre-processing step, the printing step and the post-processing step. In this case, instructions and the like to the worker can be appropriately performed according to the production conditions set in the control device 12 by managing the condition of each step by the control device 12 in the printing system 10. Thus, the worker can easily and appropriately perform the work (e.g., manual operation or the like for each device) necessary for creating the product of printing without being conscious of the production conditions and the like.

More specifically, for example, in the conventional configuration, when creating a product of printing through a plurality of steps such as a pre-processing step, a printing step, and a post-processing step, each step is usually performed independently, for example, at different bases. In addition, the condition of each step is also individually managed. As a result, in the conventional configuration, in each step, work is often performed depending on the skilled technique, skill, or the like of the worker. In particular, the pre-processing step and the post-processing step are largely dependent on the skilled techniques and skills of the worker, the know-how accumulated individually, and the like.

In addition, since a skilled skill or the like is required for each step, in the conventional configuration, the pre-processing step and the post-post-processing step are often outsourced to a specialized contractor. Therefore, conventionally, in a company or the like that performs a printing step, it has been difficult to perform internal manufacturing or the like in which the pre-processing step and the post-processing step are also performed by the company itself. In addition, since various conditions and skills are required for every step, for example, if human resources capable of performing work of a plurality of steps are to be developed, it takes a long time and a large amount of cost. Therefore, when considered in the extension of the conventional configuration, even if the pre-processing step and the post-processing step are internally manufactured, it is considered that the dependence on a person (dependence on the personal qualities of the worker) increases for the pre-processing step and the post-processing step, so that unevenness is likely to occur in quality.

On the other hand, in the present example, for example, the condition of each step can be set without depending on the skilled technique, skill, and the like of the worker by managing the production conditions in the control device 12. More specifically, in the present example, a point or the like at the time of production can be accurately instructed to the worker by display or the like on the monitor of the control device 12. In this case, the control device 12, instead of a person, can manage the know-hows and cautions in each step, which are personally stored by the worker in the conventional configuration.

Therefore, according to the present example, even a worker who does not have a skilled technique or skill can more appropriately operate the device used in each step, or the like. Furthermore, for example, it is thus possible to stably produce a product of printing without taking time and effort for human resource development and the like. In this case, each step can be appropriately executed even if the worker changes, and thus, for example, it is possible to prevent the entire production operation from stopping due to the absence of a person in charge (e.g., the person in charge of the coating step etc.) of some steps.

Furthermore, in the present example, it is conceivable to transmit (e.g., automatic transmission) the condition of each step from the control device 12 to each device via a network. More specifically, in this case, for example, it is conceivable that an operator performs only the work that requires human hands, such as replenishment of consumables, transportation of articles, and the like, and the setting of the condition of the step, and the like directly controls each device by the control device 12. With this configuration, automation of steps, reduction of human errors, and the like can be appropriately performed. In addition, for example, even when a plurality of workers perform work in one step (when steps are performed by different persons), the production of products can be performed normally and appropriately. Furthermore, even in such a case, an inquiry, confirmation, or the like of a verbal instruction or the like becomes unnecessary.

Furthermore, in the present example, the quality of the product can be stabilized by automatically setting various conditions (e.g., fine conditions in the pre-processing step and the post-processing step, and the like) that affect the quality of the product. Furthermore, according to the present example, the pre-processing step and the post-processing step can be performed without depending on the personal technique, skill, and the like of the worker, and thus, for example, the internal manufacturing of the textile production can be more easily and appropriately performed.

Here, each device constituting the printing system 10 may not necessarily be placed in the same place (base, factory, etc.), and may be placed and operated in a remote place. In this case, for example, it is conceivable to execute the pre-processing step, the printing step, and the post-processing step at different places. Furthermore, it is also conceivable to perform some of the plurality of steps (e.g., a post-processing step and a printing step) at the same place and perform other steps (e.g., a pre-processing step) at other places (e.g., a remote place). According to such configuration, the scale of the printing system 10 can be more easily enlarged, as necessary. Furthermore, in such a case as well, the product of printing can be appropriately created by managing the conditions and the like of each step using the control device 12.

As described above, in the present example, various processes are sequentially performed by each step executed by each device in the printing system 10 on the fabric used as the medium. In this case, it is preferable to uniquely identify the medium (product produced in each step) on which each step has been performed using ID or the like. More specifically, in the present example, it is conceivable that, for example, an ID for uniquely identifying each fabric is issued to a fabric used as a medium, and a label or the like indicating the ID is attached to the fabric. Furthermore, as the ID, for example, it is conceivable to use a QR code (registered trademark), a barcode, or the like. Furthermore, in this case, it is conceivable to read the ID with an ID reading device before executing each step (at the time of the next step) or the like and inquire the control device 12 to display the condition of the appropriate step for the fabric to which the ID is given on the display unit or the like of each device. According to such configuration, in each step performed to create the product, the condition suitable for the fabric to be processed can be appropriately used. In addition, this makes it possible to appropriately reduce production errors and the like.

Furthermore, as described above, in the present example, the control device 12 sets the production condition, for example, according to an instruction of an administrator of the printing system 10. Moreover, the control device 12 adjusts the condition of each step executed in the printing system 10, as necessary. When creating a product of printing in accordance with the production conditions designated by the administrator, it is ideal that the state of the medium at the time point of executing each step becomes a state predicted from the condition of the step. However, at the time of actual execution of each step, it is conceivable that an unintended result deviation or the like occurs due to various factors. In this case, the control device 12 of the present example can adjust the condition of each step based on the actually obtained result.

As described above, in the present example, the control device 12 manages the step conditions and the like for a plurality of steps performed as the pre-processing step, the printing step, and the post-processing step. In this case, it is conceivable to adjust the condition of each step in further consideration of not only the results obtained by the step but also the results obtained by other steps. More specifically, in this case, for example, the result of the printing step or the post-processing step may be taken into consideration in order to adjust the condition of the pre-processing step. Furthermore, the result of the pre-processing step or the post-processing step may be taken into consideration in order to adjust the condition of the printing step. Moreover, the result of the pre-processing step or the printing step may be taken into consideration in order to adjust the condition of the post-processing step.

More specifically, in this case, it is considered to adjust the condition of the pre-processing step or the post-processing step based on the result obtained in the printing step. In this case, for example, the control device 12 acquires printed matter information that is information indicating the state of the printed matter obtained by performing the printing step by the printer 16, and adjusts at least one of the condition of the pre-processing step executed by the pre-processing machine and the condition of the post-processing step executed by the post-processing machine based on the printed matter information and the target product information such that a product in a state closer to the state indicated by the target product information is obtained. In this case, the printed matter information can be considered as information indicating the state of the printed matter obtained by actually performing printing in the printer 16. Furthermore, the printed matter information can also be considered as information obtained by measurement or the like on the printed matter, and the like, instead of information predicted from conditions or the like of the printing step. Moreover, as described above, the target product information is information indicating the state of the target product. The target product can be considered as a desired product or the like to be obtained by performing each step in the printing system 10.

When configured in such manner, the condition of the pre-processing step executed by the pre-processing machine and the condition of the post-processing step executed by the post-processing machine can be adjusted based on the state of the printed matter obtained by performing the printing step. Thus, according to such configuration, the conditions of the steps other than the printing step can be more easily and appropriately adjusted. In addition, as a result, a product closer to the target state can be more appropriately created.

In this case, it is also conceivable to adjust the condition of the step to be performed subsequently in the middle of the operation of sequentially performing each step on one medium. More specifically, for example, even in a case where, at the time point the intermediate step is completed, there is a difference between the state of the result obtained at the time point and the state predicted by the production condition, it is conceivable to adjust the condition of the subsequent step so that the final state of the product approaches the desired state. Furthermore, as such adjustment, for example, consideration is made to adjust the condition of the subsequently performed post-processing step based on the result of the printing step at the time point the printing step is finished. According to such configuration, even if a deviation from the prediction occurs at the time point of the intermediate step, the product of printing can be appropriately created without wasting the medium. Furthermore, in this case, waste can also be reduced for the ink used in the printing step, the time required to carry out each step, and the like. In addition, such adjustment of the condition of the step can be considered as a recovery process or the like for a case where a defective product is created as is. Then, it is conceivable to perform such a recovery process by, for example, the operation as illustrated in FIG. 2.

Figure 2:
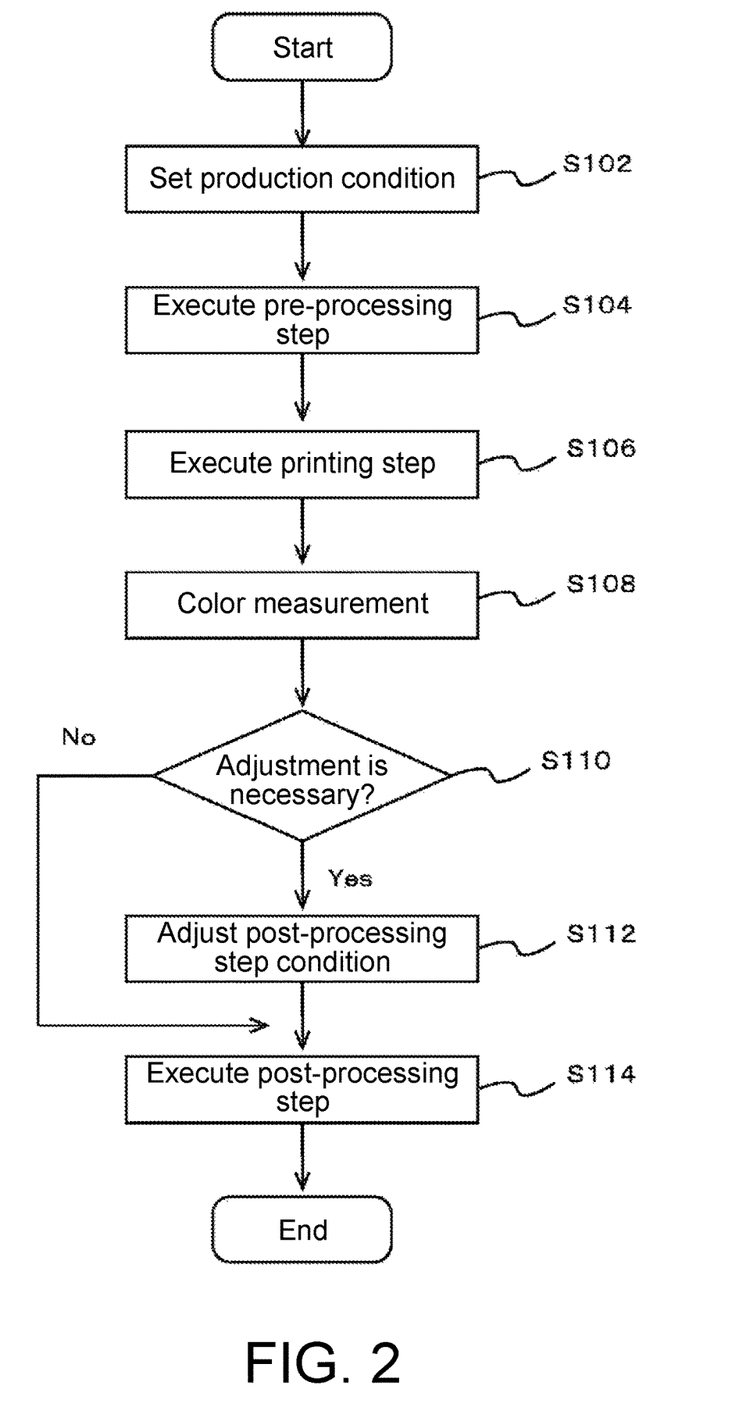
FIG. 2 is a flowchart showing one example of an operation of a recovery process performed in the present example.

FIG. 2 is a flowchart showing one example of an operation of a recovery process performed in the present example. The recovery process can be considered as an operation of confirming a state at a time point when any step performed to create a product of printing is finished, and adjusting a condition of a subsequent step based on a confirmation result. Furthermore, in this case, it is conceivable to adjust the condition of the subsequent step such that a product closer to the desired state is obtained.

More specifically, in the case of the operation shown in FIG. 2, the condition of the post-processing step subsequently performed in the steaming machine 18 is adjusted based on the state of the printed matter obtained by performing the printing step in the printer 16. In this case, the control device 12 sets the production condition, for example, according to an instruction of an administrator of the printing system 10 (S102). In this case, as described above, for example, the fabric to use, the coating condition, the printing condition, the steaming condition, the washing condition, and the like are set as the production condition. Then, based on the set production conditions, a coating step, which is a pre-processing step, is executed in the coating machine 14 (S104), and a printing step is executed in the printer 16 (S106) to create a printed matter. In this case, the printed matter at this stage can be considered as a printed matter before the post-processing step is performed.

Here, as described above, in the present example, the control device 12 sets the production condition based on the target product information. Furthermore, a printing condition is set as a production condition related to the printer 16. In this case, the printing condition set as the production condition can be considered as a condition of the printing step determined based on the target product information. In the following description, this printing condition is referred to as a determined printing condition. In this case, the operation of the printer 16 in step S106 can be considered as an operation of executing the printing step under the determined printing condition, and the like. As described above, the printer 16 uses the ink that undergoes the color development process after the printing step. In the present example, the target product information indicates the target color of the product to obtain by performing the color development process. Furthermore, the color of the printed matter before the steaming process to be the color development process is performed in the steaming machine 18 can be considered as the color before the color development process is performed.

Furthermore, after the printed matter is created in the printing step, a predetermined measurement is performed on the printed matter to acquire the printed matter information. More specifically, in the present example, printed matter information is acquired by performing color measurement on the printed matter (S108). More specifically, in the present example, information indicating the color of the ink before the color development process is performed is acquired as the printed matter information. In this case, the color of the ink before the color development process is performed can be considered as a color in a state where the color development process is not performed in the printed matter obtained by performing the printing step by the printer 16, and the like. Furthermore, for the color measurement in step S108, for example, it is conceivable to use a color measuring machine or the like included in the printer 16. In this case, for example, it is conceivable to use a configuration including a known color measuring machine as the printer 16. Furthermore, the color measurement in step S108 may be performed using a color measuring machine prepared separately from the printer 16.

Then, after the printed matter information is acquired, the control device 12 determines whether or not it is necessary to adjust the condition of the post-processing step based on the printed matter information (S110). More specifically, in the present example, the control device 12 detects, based on the printed matter information, a printing state difference, which is a difference between a state of the printed matter predicted to be obtained when the printing step is performed under the determined printing condition and a state of the printed matter obtained by actually performing the printing step. In this case, the state of the printed matter predicted to be obtained when the printing step is performed under the determined printing condition can be considered as the state of the desired printed matter, and the like. Furthermore, the printing state difference can be considered as a difference between the state of the printed matter obtained by actually performing the printing step and the state of the desired printed matter, and the like. As described above, in the present example, information obtained by performing color measurement is used as the printed matter information. In this case, it is conceivable to use the difference between the color of the printed matter predicted to be obtained when the printing step is performed under the determined printing condition and the result of color measurement on the printed matter obtained by actually performing the printing step as the printing state difference. Furthermore, in this case, the control device 12 determines whether or not the printing state difference falls within an allowable range set in advance. When it is determined that the printing state difference falls within the allowable range, determination is made that the adjustment of the condition of the post-processing step is not necessary (S110, No), and the steaming machine 18 and the washing machine 20 are caused to execute the post-processing step without adjusting the condition of the post-processing step (S114).

When it is determined in step S110 that the printing state difference exceeds the allowable range, determination is made that the adjustment of the condition of the post-processing step is necessary (S110, Yes), and the condition of the post-processing step is adjusted (S112). In this case, the control device 12 adjusts the condition of the post-processing step so that a product in a state closer to the state indicated by the target product information is obtained by determining the condition of the post-processing step based on the printing state difference. More specifically, in the present example, the control device 12 adjusts the condition of the color development process performed in the steaming machine 18 among the conditions of the post-processing step. Furthermore, in this case, at least the heating temperature and the heating time at the time of executing the color development process are determined as the condition of the color development process after the adjustment. According to such configuration, regarding the color development process executed as the post-processing step, the condition can be appropriately adjusted. Furthermore, in this case, the control device 12 adjusts the condition of the post-processing step (condition of color development process) based on a color in a state where the color development process in the printed matter obtained by performing the printing step by the printer 16 is not performed by being based on the printed matter information and the printing state difference. In this case, the condition of the color development process is adjusted so that the color of the ink obtained by performing the color development process matches the target color. In addition, the control device 12 preferably adjusts the condition of the post-processing step in further consideration of environmental conditions such as ambient temperature and humidity. According to such a configuration, the condition of the step can be more appropriately adjusted. Furthermore, in step S112, the control device 12 determines the condition of the post-processing step by, for example, performing selection from a plurality of conditions prepared in advance as the selectable condition of the step. Thus, according to such configuration, the condition of the processing step to be adjusted can be more easily and appropriately adjusted.

When the condition of the post-processing step is adjusted in step S112, the control device 12 causes the steaming machine 18 and the washing machine 20 to execute the post-processing step using the condition of the post-processing step after the adjustment (S114). Thus, the control device 12 causes the steaming machine 18 and the washing machine 20 to execute the post-processing step on the printed matter used to detect the printing state difference under the condition of the post-processing step determined based on the printing state difference.

When configured in such manner, the condition of the post-processing step can be appropriately adjusted as necessary. Therefore, according to the present example, even when the difference between the state of the printed matter obtained by actually performing the printing step and the state of the desired printed matter is large, the recovery process can be appropriately performed to bring the state of the ultimately obtained product close to the desired condition. Thus, the product colored in a desired color can be more appropriately created. Furthermore, in this case, the product of printing can be appropriately created without wasting the medium, as described above, by performing the recovery process. Furthermore, for example, waste can also be reduced for the ink used in the printing step, the time required to carry out each step, and the like.

Furthermore, in the printing system 10, the condition of the step may be adjusted for a purpose other than the recovery process. For example, when it is difficult to change the condition of a predetermined step other than the printing step, it is also conceivable to adjust the condition of the printing step based on the state of the product obtained by performing the printing step, the predetermined step, and the like. Furthermore, in this case, it is conceivable to make the operation and the like of the control device 12 partially different from the case illustrated in FIG. 2.

Figure 3:
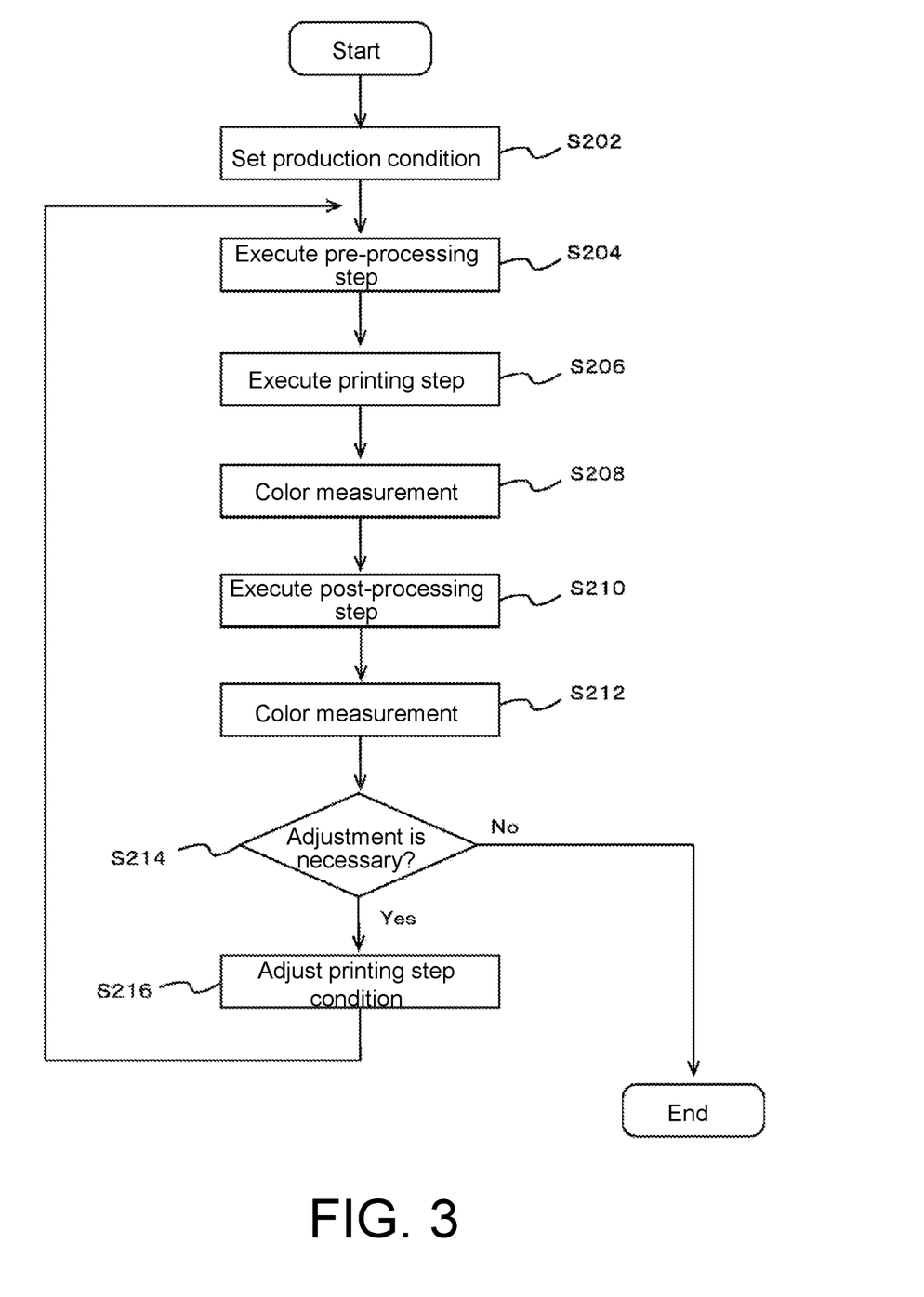
FIG. 3 is a flowchart showing another example of an operation performed by the printing system 10.

FIG. 3 is a flowchart illustrating another example of the operation performed in the printing system 10, and illustrates an example of the operation in a case where the condition of the printing step is adjusted based on the state of the product obtained by executing up to the post-processing step. In this case, adjusting the condition of the printing step can be considered as adjusting the condition of the printing step to be executed next time or later. Furthermore, such adjustment can be considered as adjusting the condition of the printing step performed at the time of creating a product to be created later.

More specifically, in this case, for example, the setting of the production condition (S202), the execution of the coating step (S204), which is the pre-processing step, and the execution of the printing step (S206) are performed in the same manner as or similar to the operations of steps S102, S104, and S106 in the case described above with reference to FIG. 2. In this case as well, the color measurement is performed to acquire the printed matter information in the same manner as or similar to the operation of step S108 in the case described above with reference to FIG. 2 (S208).

In this case, as opposed to the case described above with reference to FIG. 2, the printed matter information acquired in step S208 is used, as necessary, not for the recovery process but at the time of adjusting the condition of the printing step to be performed later. Therefore, in this case, following step S208, the control device 12 causes the steaming machine 18 and the washing machine 20 to execute the post-processing step by using the condition of the post-processing step included in the production conditions set in step S202 without adjusting the condition of the post-processing step or the like (S210). Thus, the printing system 10 creates the product of printing according to the production condition.

Then, in the case of the operation illustrated in FIG. 3, after the product is created, the control device 12 adjusts the condition of the printing step used when further creating the same product as necessary. More specifically, in this case, created product information, which is information indicating the state of the product is acquired by performing color measurement on the product created by performing up to the post-processing step, (S212). The created product information can be considered as information indicating the color of the ink after the color development process is performed in the steaming machine 18.

Then, in this case, the control device 12 determines whether or not the color of the created product is a desired color based on the target product information, the created product information, and the like. Whether or not it is necessary to adjust the condition of the printing step is determined according to the determination result (S214). More specifically, in this case, the control device 12 compares the result of performing color measurement in step S212 with the color indicated by the target product information, and determines that the condition of the printing step needs to be adjusted when the difference between the colors exceeds a predetermined allowable range.

When it is determined that the condition of the printing step need to be adjusted (S214, Yes), the condition of the printing step is adjusted based on the created product information and the like (S216). Then, the next product is created by repeating the operation of step S204 and subsequent steps using the condition of the printing step after the adjustment. Further, when it is determined in step S214 that the condition of the printing step does not need to be adjusted (S214, No), the next product is created by repeating the operations of step S204 and subsequent steps without adjusting the condition of the printing step. According to such configuration, the condition of the printing step can be appropriately adjusted as necessary.

Furthermore, in this case, in step S214, the control device 12 adjusts the condition of the printing step such that a product in a state closer to the state indicated by the target product information is obtained based on the state of the product obtained by actually executing up to the post-processing step, the target product information, the conditions of the steps set for each step such as the pre-processing step and the post-processing step, and the like. In this case, the result of the color measurement performed in step S212 is used as the state of the product obtained by actually executing up to the post-processing step. With this configuration, it is possible to more appropriately create a product closer to the target state after adjusting the condition of the printing step.

As described above, in the operation shown in FIG. 3, in step S208, the color measurement is also performed for the color before performing the post-processing step. In this case, in step S216, the control device 12 may further adjust the condition of the printing step based on the result of the color measurement performed in step S208. According to such a configuration, the condition of the printing step can be adjusted with higher accuracy. Furthermore, in step S214, the control device 12 determines the condition of the printing step to be executed by the printer 16 by, for example, performing selection from a plurality of conditions prepared in advance as the selectable condition of the printing step. According to such a configuration, the printing condition can be easily and appropriately adjusted.

Next, supplementary description regarding each configuration described above, description on a modified example, and the like will be made. As described above, in the present example, the conditions of each step are adjusted as necessary. In this case, it is also conceivable to use the control device 12 having a learning function and adjust the conditions of each step using the result of learning.

In this case, the learning function is, for example, a function of performing machine learning. Furthermore, for example, it is conceivable to use deep learning as the learning. Furthermore, regarding the control device 12, being capable of learning can be considered as being capable of adjusting the condition of the step and the like using a learning model and adjusting parameters of the learning model, and the like. Furthermore, in this case, a learning model managed by a computer other than the control device 12 may be used as the learning model. In this case, performing learning in the control device 12 can be considered as adjusting a parameter of a learning model using data input via the control device 12, and the like. Furthermore, it is conceivable to create the learning model in advance before creating the first product in the printing system 10. Moreover, in this case, it is conceivable that the control device 12 adjusts the parameter of the learning model based on the state of the product to be subsequently created in the printing system 10.

More specifically, the control device 12 has a function of learning for a relationship between a state of a product obtained by executing each step in the printing system 10 and a condition of each step. In this case, learning about these relationships means adjusting the parameter of a learning model corresponding to an input/output in which a part of these relationships is used as an input and the other part is used as an output. Furthermore, in this case, it is conceivable to use the condition of the printing step and the condition of a predetermined step other than the printing step as the condition of each step. As the condition of the predetermined step, it is conceivable to use the condition of any step performed in the pre-processing step and the post-processing step. Furthermore, regarding the fact that the control device 12 has a learning function, it can be considered that means for performing learning (learning means) is realized by the control device 12. In addition, in this case, it can also be considered that each unit (e.g., a storage means, a CPU, etc.) of the control device 12 functions as a learning means.

Furthermore, as described above, for example, when adjusting the condition of the step such as the condition of the color development process in the post-processing step, the condition of the printing step, and the like, it is conceivable to perform the adjustment by performing selection from a plurality of conditions prepared in advance. In this case, it is conceivable to use a plurality of conditions including the condition prepared by performing the learning as described above as a plurality of conditions prepared in advance as the selectable conditions of the step. With this configuration, for example, it is possible to appropriately prepare a condition corresponding to the state of the printed matter or the product to be actually created as the plurality of selectable conditions. Thus, the condition of the step to be adjusted can be more appropriately adjusted.

In the description made above, the case where the coating step, the steaming step, and the washing step are mainly performed for the steps other than the printing step performed in the printing system 10, and the conditions of these steps are managed in the control device 12 has been described. However, in a modified example of the configuration of the printing system 10, it is also conceivable to manage the conditions of steps other than the above in the control device 12. Furthermore, as such a step, for example, a step of fabric inspection, a step of cutting, and the like can be considered. Regarding these steps as well, the product of printing can be more appropriately created by managing the condition of the step in the control device 12. Furthermore, in the description made above, the manner of creating a product of printing has been mainly described for the configuration in the case where direct printing (direct print) is performed on a medium (fabric) to be a product. However, in a modified example of the printing system 10, for example, the product of printing may be created by performing a transfer step in a post-processing step. In this case, it is also conceivable to perform color development process in the transfer step.

Furthermore, in the above description, the configuration and operation in the case where production of a textile is performed by performing printing on a fabric medium have been mainly described for the printing system 10. However, in a modified example of the printing system 10, the printing system 10 may perform operations other than the production of textiles.

Figure 4:
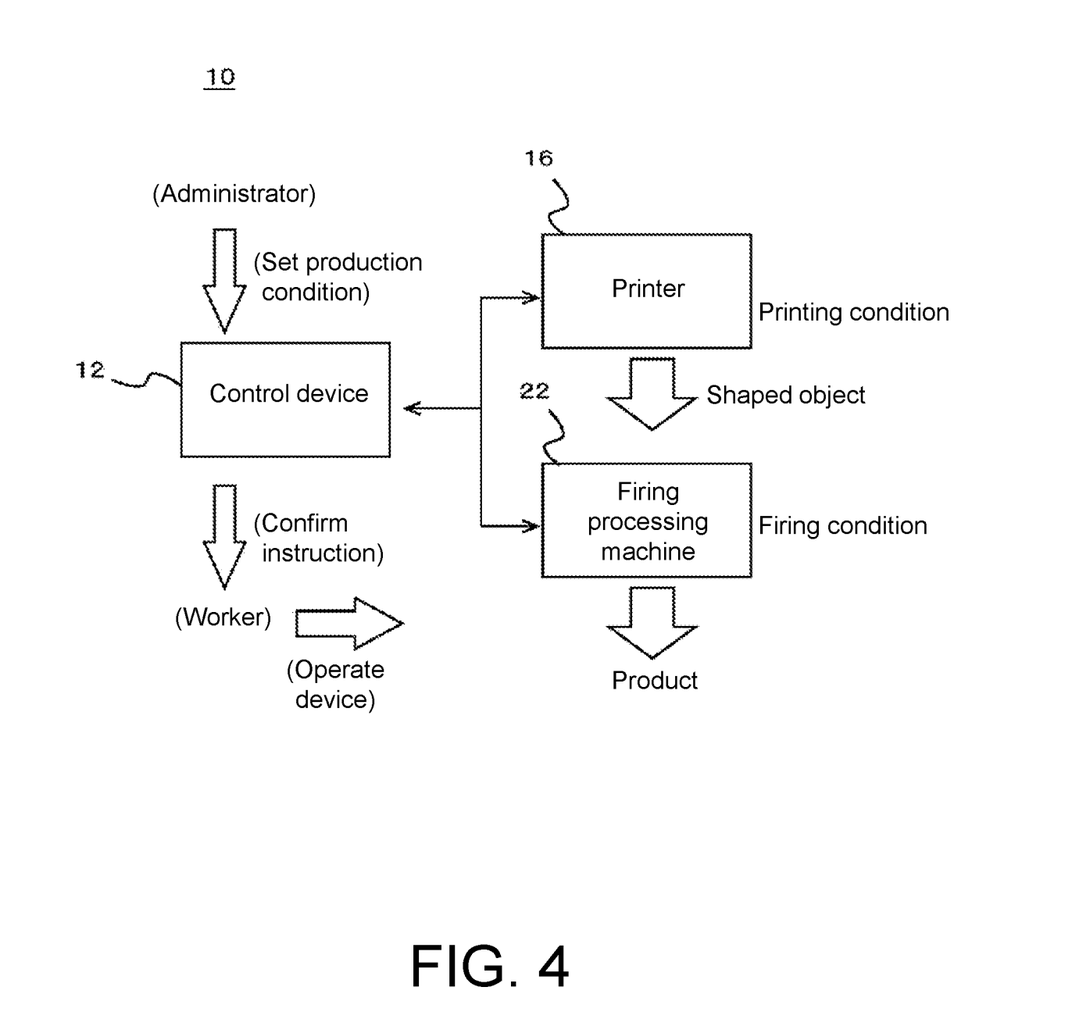
FIG. 4 is a view describing a modified example of the printing system 10.

FIG. 4 is a view describing a modified example of the printing system 10, and shows one example of a configuration and an operation of the printing system 10. Other than the points described below, in FIG. 4, the configurations denoted with the same reference numbers as FIGS. 1 to 3 may have features same as or similar to the configurations in FIGS. 1 to 3. In the present modified example, the printing system 10 is a system that creates (shapes) a three-dimensional shaped object by layering a plurality of ink layers in a printing step, and includes the control device 12, the printer 16, and a firing processing machine 22.

In the present modified example as well, the control device 12 is a computer that manages production conditions, and manages a condition of a step executed in each device in the printing system 10, and the like as the production condition. Furthermore, in the present modified example as well, the control device 12 sets the production condition, for example, according to an instruction of an administrator of the printing system 10. In this case, as the production conditions, for example, printing conditions, which are conditions of a printing step executed in the printer 16, firing conditions, which are conditions of a firing process (firing step) executed in the firing processing machine 22, and the like are set. Moreover, the control device 12 adjusts the condition of each step executed in the printing system 10, as necessary. Furthermore, the control device 12 controls the operation of each device in the printing system 10 based on the set production condition. In addition, the control device 12 may control the operation of each device through hands of the worker by giving an instruction to the worker by, for example, display on a monitor or the like.

The printer 16 is a printing apparatus that executes the printing step. In the present modified example, the printer 16 forms a layer of ink by ejecting ink through an inkjet method. In this case, for example, the printer 16 receives data indicating a position where the ink is to be ejected from the control device 12, and ejects the ink based on the data to form a layer of ink. Furthermore, in the present modified example, the printer 16 forms a three-dimensional shaped object by forming a plurality of layers of ink in an overlapping manner. In this case, the operation of creating the shaped object can be considered as an example of the operation of printing performed in the printer 16. Furthermore, the operation of layering a plurality of layers of ink to create a shaped object can be considered as the operation of the printing step. Thus, in the present modified example as well, the printer 16 executes the printing step according to the condition of the printing step designated in the production condition set with respect to the control device 12. Furthermore, in the present modified embodiment, for example, the shaped object created by the printing step can be considered as an example of a printed matter. The state of the shaped object can be considered as the state of the printed matter. In addition, the information indicating the state of the shaped object can be considered as an example of printed matter information.

More specifically, in the present modified example, the printer 16 executes the printing step using ink that undergoes the firing process after the printing step. As such an ink, for example, it is conceivable to use an ink containing alumina (aluminum oxide) and resin (e.g., binder resin). As such ink, known ink for firing process can be suitably used. Furthermore, in this case, it is considered to carry out the shaping of the three-dimensional object, for example, by layering a layer of ink on the medium. In this case, the printer 16 can be considered as, for example, a 2.5D printer. Furthermore, it is also considered to carry out the shaping of the three-dimensional object by layering the layer of ink on a shaping table or the like provided in the printer 16 without using the medium. In this case, the printer 16 can be considered as, for example, a 3D printer.

Furthermore, in the present modified example, the firing processing machine 22 is an example of a device for a predetermined step and a post-processing machine, and executes the firing process on the shaped object formed by executing the printing step in the printer 16. In this case, the firing process can be considered as a process of removing a non-heat resistant component by heating a target object to leave a heat resistant component. More specifically, for example, when an ink containing alumina and resin is used, it is conceivable to remove the resin component by heating and leave the alumina component in the firing process. In this case, for example, it is conceivable to perform a degreasing process, a sintering process, and the like as the firing process on the shaped object by heating the shaped object while changing the temperature under a predetermined condition. Furthermore, in the present modified example, the firing processing machine 22 performs the firing process on the shaped object created in the printing step by executing the step of firing process under the condition of the firing process designated as the production conditions. In this case, as the condition of the firing process, for example, it is conceivable to set temperature raising process conditions indicating how to raise the temperature in the firing process, and the like. According to such configuration, for example, the three-dimensional shaped object can be appropriately shaped in the printing system 10.

Furthermore, in the present modified example, for example, it is conceivable to perform the recovery process with the same or similar concept as in the case described with reference to FIGS. 1 to 3. In this case, for example, it is considered to perform the recovery process by adjusting the condition of the firing process after carrying out the shaping of the shaped object by the printing step. More specifically, in this case, it is conceivable to use, as the target product information, information indicating an after-processing target state, which is a state of the shaped object to be obtained after the firing process is performed. Furthermore, in this case, the control device 12 adjusts the condition of the firing process to be executed in the firing processing machine 22 based on the state of the shaped object created in the printing step so that the state of the shaped object after the firing process is performed approaches the after-processing target state. It is considered to taken into consideration the outer dimension, and the like, for example, for the state of the shaped object created in the printing step. Furthermore, it is also considered to take into consideration the type, content, and the like of the resin contained in the ink, for example, for the state of the shaped object. Furthermore, in this case, the state of the shaped object created in the printing step can be considered as the state of the shaped object after the printing step is performed and before the firing process is performed, and the like. According to such configuration, the condition of the firing process can be appropriately adjusted.

Furthermore, in this case, even if the difference between the state of the shaped object obtained by actually performing the printing step and the state of the desired printed matter, and the like is large, the state of the shaped object after firing to be created as a product can be appropriately brought close to the desired conditions by adjusting the condition of the firing process to be carried out thereafter. The recovery process thus can be appropriately performed. When the recovery process is performed in this manner, it is conceivable that the control device 12 determines, for example, a temperature raising process condition for performing the recovery process as a condition of the firing process. According to such a configuration, the condition of the firing process can be appropriately adjusted.

Furthermore, in the present modified example as well, it is conceivable to adjust the condition of the printing step as necessary. More specifically, for example, it is conceivable to adjust the condition of the printing step in a case where it is difficult to change the condition of the firing process, a case where a desired product cannot be obtained only by adjusting the condition of the firing process, and the like. Furthermore, in this case, consideration is made to adjust the condition of the printing step based on the state of the shaped object after performing the firing process. With this configuration, a product to be created later can be brought closer to a desired state.

In FIG. 4 and the above, for the sake of convenience of illustration and description, only the printer 16 and the firing processing machine 22 are illustrated and described as the configuration of the printing system 10. However, in a further modified example of the printing system 10 that carries out the firing process to shape the shaped object, for example, a product may be created by further using a device other than the control device 12, the printer 16, and the firing processing machine 22. More specifically, in a further modified example of the printing system 10, for example, consideration is made to perform the degreasing process on the shaped object by a device different from the firing processing machine 22. In this case, in the firing processing machine 22, for example, it is conceivable to perform the firing process on the shaped object after the degreasing process. Furthermore, in this case, for example, consideration is also made to adjust the condition of the firing process performed in the firing processing machine 22 based on the state of the shaped object after performing the degreasing process. With this configuration, the recovery process can be appropriately performed with higher accuracy.

INDUSTRIAL APPLICABILITY

The present invention can be suitably used in, for example, a printing system.

The invention claimed is:

1. A printing system that creates a product of printing by performing at least printing, the printing system comprising:
a printing apparatus that executes a printing step of performing printing by ejecting ink;
a device for a predetermined step, which is a device that executes a predetermined step before or after the printing step to create the product; and
a control device that determines conditions of the printing step and the predetermined step,
wherein
the control device acquires printed matter information that is information indicating a state of a printed matter obtained by performing the printing step by the printing apparatus, and adjusts a condition of the predetermined step executed by the device for a predetermined step based on target product information, that is information indicating a state of the target product, and the printed matter information such that the product in a state closer to a state indicated by the target product information is obtained, wherein
the predetermined step is a post-processing step performed after the printing step,
the post-processing step is a step for changing the state of the printed matter by processing the printed matter;
wherein
the device for a predetermined step is a post-processing machine that executes the post-processing step on the printed matter obtained by performing the printing step by the printing apparatus;
wherein
the printing step is a step of ejecting ink that undergoes a color development process after the printing step,
the post-processing step is a step of performing the color development process on the ink used in the printing step, the target product information indicates a target color of the product to be obtained by performing the color development process, and the control device adjusts the condition of the post-processing step executed in the post-processing machine so that the color of the ink obtained by performing the color development process matches the target color based on the color in a state where the color development process is not performed in the printed matter obtained by performing the printing step in the printing apparatus.

2. The printing system as set forth in claim 1, wherein the control device determines a condition of the predetermined step to be executed in the device for a predetermined step by performing selection from a plurality of conditions prepared in advance as selectable conditions of the predetermined step.

3. The printing system as set forth in claim 2, wherein the control device has a function of learning a relationship of a state of the product obtained by executing the printing step and the predetermined step, a condition of the printing step, and a condition of the predetermined step, and the plurality of conditions include a condition prepared by performing the learning.

4. The printing system as set forth in claim 3, wherein the control device performs machine learning as the learning.

5. The printing system as set forth in claim 1, wherein the control device includes causing the printing apparatus to execute the printing step under a determined printing condition that is a condition of the printing step determined based on the target product information, and detecting a printing state difference that is a difference between a state of the printed matter predicted to be obtained when the printing step is performed under the determined printing condition and a state of the printed matter obtained by actually performing the printing step based on the printed matter information, and determining a condition of the post-processing step based on the printing state difference to adjust a condition of the post-processing step executed in the post-processing machine such that the product in a state closer to the state indicated by the target product information is obtained.

6. The printing system as set forth in claim 5, wherein the control device causes the post-processing machine to execute the post-processing step on the printed matter used to detect the printing state difference under a condition of the post-processing step determined based on the printing state difference.

7. The printing system as set forth in claim 1, wherein the control device determines at least a heating temperature and a heating time at the time of executing the color development process as condition of the post-processing step.

8. The printing system as set forth in claim 1, wherein the printing step is a step of ejecting ink that undergoes a firing process after the printing step, the printing apparatus creates a three-dimensional shaped object by layering layers of ink in the printing step, the post-processing step is a step of performing the firing process on the shaped object created in the printing step, the target product information indicates an after-processing target state that is a state of the shaped object to be obtained after the firing process is performed, and the control device adjusts condition of the post-processing step to be executed in the post-processing machine based on a state of the shaped object created in the printing step so that a state of the shaped object after the firing process is performed approaches the after-processing target state.

9. The printing system as set forth in claim 8, wherein the control device determines at least a temperature raising process condition indicating how to raise the temperature in the firing process as condition of the post-processing step.

10. A printing system that creates a product of printing by performing at least printing, the printing system comprising:

a printing apparatus that executes a printing step of performing printing by ejecting ink;

a device for a predetermined step, which is a device that executes a predetermined step before or after the printing step to create the product; and a control device that determines conditions of the printing step and the predetermined step, wherein the control device adjusts a condition of the printing step based on a state of the product obtained by actually executing the printing step and the predetermined step by the printing apparatus and the device for a predetermined step, target product information that is information indicating a state of the target product, and a condition of the predetermined step to be executed in the device for the predetermined step such that the product in a state closer to a state indicated by the target product information is obtained, wherein the predetermined step is a post-processing step performed after the printing step, the post-processing step is a step for changing the state of the printed matter by processing the printed matter;

wherein the device for a predetermined step is a post-processing machine that executes the post-processing step on the printed matter obtained by performing the printing step by the printing apparatus;

wherein the printing step is a step of ejecting ink that undergoes a color development process after the printing step, the post-processing step is a step of performing the color development process on the ink used in the printing step, the target product information indicates a target color of the product to be obtained by performing the color development process, and the control device adjusts the condition of the post-processing step executed in the post-processing machine so that the color of the ink obtained by performing the color development process matches the target color based on the color in a state where the color development process is not performed in the printed matter obtained by performing the printing step in the printing apparatus.

11. The printing system as set forth in claim 10, wherein the control device determines a condition of the printing step executed in the printing apparatus by performing selection from a plurality of conditions prepared in advance as selectable conditions of the printing step.

12. The printing system as set forth in claim 11, wherein the control device has a function of learning a relationship of a state of the product obtained by executing the printing step and the predetermined step, a condition of the printing step, and a condition of the predetermined step, and the plurality of conditions include a condition prepared by performing the learning.

13. The printing system as set forth in claim 12, wherein the control device performs machine learning as the learning.

14. A control device that determines a condition of a step executed in a printing system that creates a product of printing by performing at least printing, wherein the control device
    determines a condition of a printing step executed in a printing apparatus that performs printing by ejecting ink, and a condition of a predetermined step executed before or after the printing step to create the product in a device for a predetermined step that is a predetermined apparatus different from the printing apparatus, and
    acquires printed matter information that is information indicating a state of a printed matter obtained by performing the printing step in the printing apparatus, and adjusts a condition of the predetermined step executed in the device for a predetermined step based on target product information, that is information indicating a state of the target product and the printed matter information such that the product in a state closer to a state indicated by the target product information is obtained, wherein
    the predetermined step is a post-processing step performed after the printing step,
    the post-processing step is a step for changing the state of the printed matter by processing the printed matter;
wherein
    the device for a predetermined step is a post-processing machine that executes the post-processing step on the printed matter obtained by performing the printing step by the printing apparatus;
wherein
    the printing step is a step of ejecting ink that undergoes a color development process after the printing step,
    the post-processing step is a step of performing the color development process on the ink used in the printing step,
    the target product information indicates a target color of the product to be obtained by performing the color development process, and
    the control device adjusts the condition of the post-processing step executed in the post-processing machine so that the color of the ink obtained by performing the color development process matches the target color based on the color in a state where the color development process is not performed in the printed matter obtained by performing the printing step in the printing apparatus.

* * * * *